Patented May 31, 1938

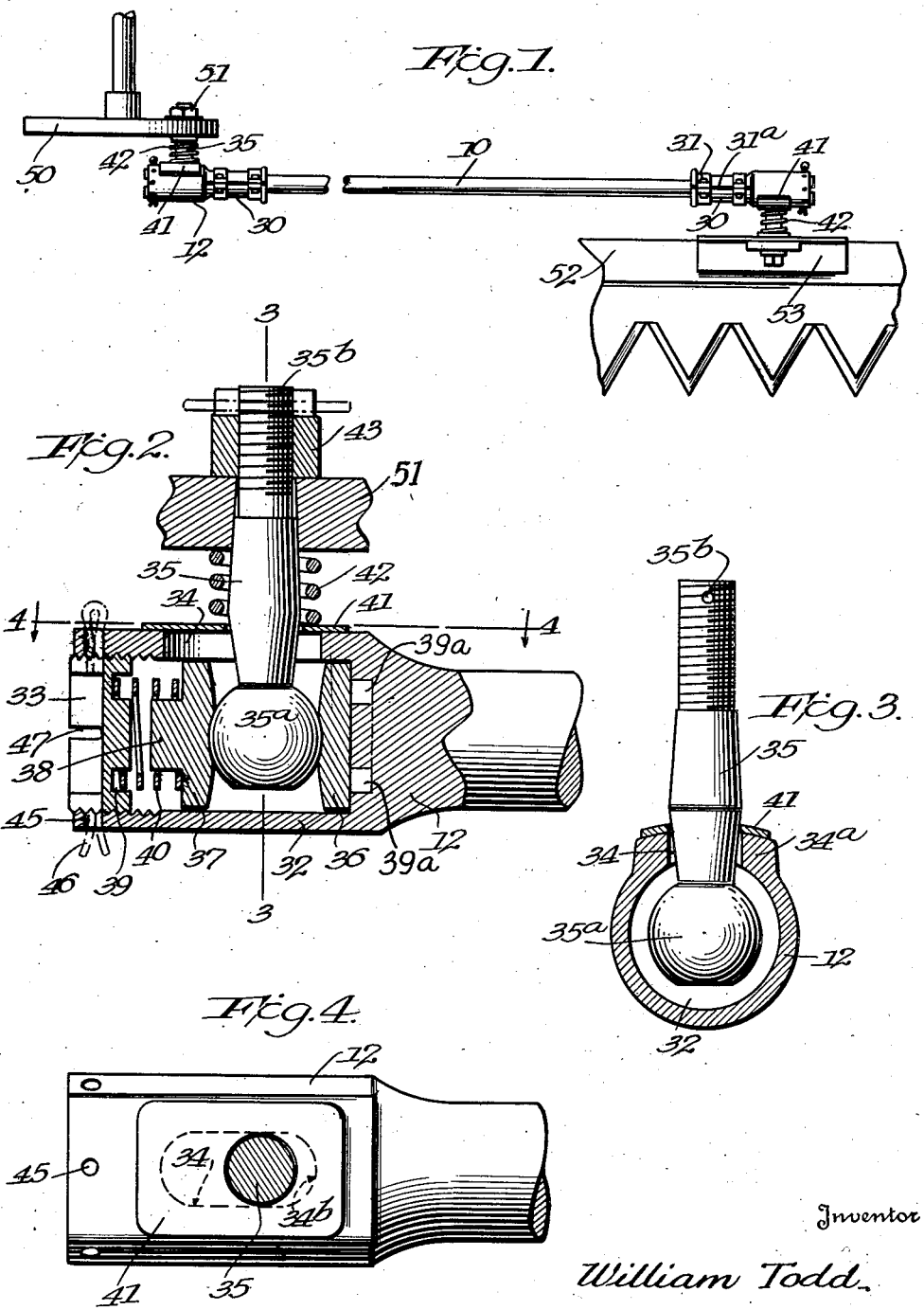

2,118,990

UNITED STATES PATENT OFFICE 2,118,990

COUPLING DEVICE

William Todd, Leominster, Mass.

Original application February 16, 1933, Serial No. 657,098. Patent No. 2,014,871, dated September 17, 1935. Divided and this application September 14, 1935, Serial No. 40,637

2 Claims.  (Cl. 287—90)

The present invention is broadly a coupling device susceptible of many uses, among which are steering gear connections, such as tie-rods and drag link connections, particularly; draft coupling or link connections for vehicles; pitman rods or machine linkage and others, where a yieldable coupling between parts is desirable.

However, specifically the invention resides in a coupling device of sundry details of novel construction, the combination and arrangement of parts, and the advantages flowing therefrom, as shown in the accompanying drawing and more particularly described and claimed in this application, which is a division of co-pending application Ser. No. 657,098, now Patent No. 2,014,871 granted September 17, 1935.

In the drawing, which shows the preferred and perfected embodiment of the invention, as at present devised:—

Figure 1 is an elevation of the coupling device of the present invention illustrating its use as coupling between actuating and cutting parts respectively of a mower or harvester;

Figure 2 is an enlarged fragmentary sectional view of one end of the coupling device to show detailed construction and disposition of parts;

Figure 3 is a sectional view taken substantially on lines 3—3 of Figure 2;

Figure 4 is a view taken substantially on line 4—4 of Figure 2.

Referring in detail to the drawing, the coupling device of the present invention consists of a bar or rod 10, which may or may not be threaded at its ends. If threaded, it is preferred that the ends of rod be provided with right and left threads, respectively.

Each threaded end 11 of the rod is threadedly received in a split socket 30 of the coupling members 12, per se, which can be equally adjusted with respect to each other by the rotation of the rod 10, when the clamping bolts 31 are loosened to release the bands around the split sockets 30. There are two clamping bolts 31 and bands on each coupling member 12, so as to insure the maintenance of the proper adjusted position of the coupling members 12 on the ends of the rod 10.

These coupling members 12 may not be necessarily connected by a separate rod 10, but may be integrally connected, which connection or rod 10, as is the case, may be of any suitable length.

The coupling members 12 are preferably of the ball and socket type, and each comprise an elongated tubular socket 32 formed in one end portion of the coupler member 12. These sockets are opened at one of their outer ends, which is internally threaded to receive and maintain the plug nut 33. The sidewall of the socket is provided with an elongated slot 34 extending longitudinally thereof. A ball headed stud 35 is provided with the ball head 35a thereof disposed within the socket and maintained in position between the bearing pads 36 and 37, while the stud 35 extends through the slot 34 for connection with a steering knuckle, or any other connecting member 51 or 53. The slot 34 is of a width throughout its length less than the diameter of the head 35a so as to prevent the ball head from being withdrawn therefrom, and is of such length as to permit lateral movement of the stud in the slot and longitudinally thereof.

The area of the socket 32 about the slot 34 is of greater thickness, 34a, thereby standing longer against wear and providing a reinforced area where the strain is the greatest. Also the ends of the slot 34 are rounded, 34b, to conform with the curvature of the stud in order to prevent cutting of the parts if one is of harder material than the other.

The stud 35 is assembled in the socket 32 by inserting the threaded end 35b thereof into the opened end of the socket and then directing it through the slot 34; and it is obvious that the stud may be quickly removed from the socket in a reversed manner.

The bearing pad 36 is positioned against the closed end of the socket, while the pad 37 is arranged to engage the opposite side of the ball head 35a. Both of said pads are of a diameter and width to have a sliding fit with the sidewalls of the socket so that said pads will not become tilted in position, but will maintain a position to properly hold the head 35a therebetween.

The pad 37, as shown in Fig. 2, is provided with a rearwardly extending guide stem 38, while the inner face of the plug nut 33 is formed with an annular recess 39 to receive an end of the coil spring 40. The stem 38 and the recess 39 are of such diameter as will properly fit the interior diameter of the helical spring 40 in order to maintain the spring in proper position so that it will not tilt or bow and will at all times exert a proper pressure against the pad 37. It will be understood, of course, that since the coupling device of the invention is to absorb shock and strain transmitted thereto, the pads 36 and 37 are conversely disposed in the other socket 32 on the other end of the rod 10 and with the spring 40 engaging in an annular recess 39a (corresponding to recess 39 in plug nut 33) in the inner or closed end of the socket. It will be observed that applicant has shown a helical spring whose convolutions are flat in cross section, because it has been found that such a spring does not break or crystallize as quickly as a spring whose convolutions are circular in cross section. By adjustment of the plug 39 in the threaded end of the socket 32, the proper tension can be applied to the spring 40 to maintain the pads in proper engagement with the ball head 35a.

In order to exclude dust, water and other foreign substances from the interior of the socket 33, a dust plate 41 is provided which is formed transversely to conform with the contour of the exterior surface of the socket 32 adjacent the slot 34 therein. This plate is of such a size as to fully cover the slot 34 in all positions of the stud 35, and is provided with an opening therein of a diameter only to permit the stud 35 to pass therethrough. The plate is held yieldably in position by a helical spring 42 surrounding the stud and interposed between the part 51 or 53 to which the stud is attached and the plate 41, a nut 43 on the stud end 35b maintaining the parts in assembled relation.

A lubricating fitting 44 is threaded in an opening in the sidewall of the socket 32, preferably, opposite the ball head 35a, so that the socket may be maintained with grease or other lubricant material.

The outer end of each socket 32 is provided with a spaced series of circumferentially extending apertures through which a cotter pin 45 may be inserted to align with suitable kerfs or notches 46 in the outer face of the plug nut 33, so as to maintain the plug nut in its adjusted position.

It will also be seen that the dimensions of the sockets 32 are such as to permit the stud and ball head to move longitudinally in the slot 34, as well as a yielding longitudinal movement of the bearing pads 37 or 36, as the case may be, in the socket, so that any undue strains or shocks, which are encountered and transmitted therethrough to the rod 10, may be yieldably absorbed by the helical springs 40, thus relieving the peak of the shock.

As above stated the invention is useful in many connections and has been found to be of particular utility in harvesting mowers where the reciprocating cutter 50 (Fig. 1) is connected by the present coupling device to a driving or actuating disc 51, suitably rotated from a source of power. One end of the coupling device has its stud 35, threaded or otherwise secured to the disc at a point off-center to its axis of rotation, as at 52, and the stud at its other end secured to a bracket 53 of the movable cutter 50, which bracket 53 is disposed in alignment with the stud 35, at 52.

Particularly in connection with mowing machines for cutting hay, corn, bushes and the like and of the reciprocating cutting type I propose to employ the present invention. Heretofore the connecting rod between the actuating crank and the reciprocating cutting bar has been made of wood, to the ends of which have been bolted clamping plates or jaws for connection to the operating parts. This construction permits no give or yield when the knives contacted growth heavier than the machine was contemplating cutting, or other obstacles, and the strain on the parts frequently caused them to break, particularly the wood connecting rod. The contacting of such heavy objects also cause an unnecessary sudden pull on the draft animals. The use of the present invention permits this strain or shock to be absorbed gradually and permits the machine to work without breaking of parts, when such obstacles are encountered. It also allows for easier operation as the ball and socket joint of the coupling member need not be so tightly clamped.

It will also be observed that due to the relative size of the ball 35a and the slot 34a that there will be no disconnection between the parts in any of the uses of the device.

In this specification and the annexed drawing, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

Having thus described the invention and the manner in which the same is to be performed, what is claimed as new and upon which Letters Patent is desired, is:

1. In a yieldable pitman connection for use with a mowing machine having a driving member and a movable cutter, comprising a rod having an end provided with an axially disposed and outwardly facing tubular socket internally threaded adjacent its free end, said socket having a longitudinally extending slot formed through the wall thereof and having its ends terminating a slight distance inwardly of the ends of the socket, a threaded stud having an enlarged ball-head formed on one end thereof of greater diameter than the width of said slot, said ball-headed stud being insertable and removable only through the open end of the socket and having its shank extending through said slot, spaced bearings in the socket for the ball-head positioned on opposite sides of the latter, one of said bearings having an axially extending stud formed on its outer face, an externally threaded plug disposed in the internally threaded free end of the socket and having its inner face provided with an annular groove, the inner wall defining said groove being aligned with the axially extending stud formed on one of said bearings, and a helical spring having one of its ends seated in said groove and having its opposite end surrounding the axially extending stud formed on the bearing, whereby to maintain the latter in substantial axial alignment with the internal wall of the socket.

2. In a yieldable connection for use with a mowing machine having a driving member and a movable cutter, comprising a rod having an end provided with an axially disposed and outwardly facing tubular socket internally threaded adjacent its free end, said socket having a longitudinally extending slot formed through the wall thereof and having its ends terminating a slight distance inwardly of the ends of the socket, a ball-headed stud for said socket and having the head thereof disposed therein and the shank extending through said slot, said head being of greater diameter than the width of said slot, said ball-headed stud being insertable and removable only through the open end of the socket, a pair of spaced bearings in said socket for said ball-head therein and positioned on opposite sides of the latter, one of said bearings having an axially extending stud formed on its outer face, an externally threaded plug for said socket and disposed in the internally threaded free end of said socket, the part of said socket opposed to the studded bearing being provided with an annular groove whose inner wall defining said groove is aligned with the axially extending stud formed on said bearing, and a helical spring in said socket and having one of its ends seated in said groove and having its opposite end surrounding the axially extending stud formed on said studded bearing, whereby to maintain the latter in substantial axial alignment with the internal wall of the socket.

WILLIAM TODD.